(12) United States Patent
Ouvry et al.

(10) Patent No.: US 9,236,894 B2
(45) Date of Patent: Jan. 12, 2016

(54) RECONFIGURABLE MULTI-CHANNEL UWB RECEIVER

(71) Applicants: Commissariat a l'energie atomique et aux energies alternatives, Paris (FR); BE SPOON, Bourget du Lac (FR)

(72) Inventors: Laurent Ouvry, Grenoble (FR); Francois Dehmas, Vif (FR); Frederic Hameau, Saint Nizier du Moucherotte (FR); Gilles Masson, Renage (FR)

(73) Assignees: Commissariat à l'énergie atomique et aux énergies alternatives, Paris (FR); BE SPOON, Bourget du Lac (FR)

( * ) Notice: Subject to any disclaimer, the term of this patent is extended or adjusted under 35 U.S.C. 154(b) by 0 days.

(21) Appl. No.: 14/435,338

(22) PCT Filed: Oct. 10, 2013

(86) PCT No.: PCT/EP2013/071131
§ 371 (c)(1),
(2) Date: Apr. 13, 2015

(87) PCT Pub. No.: WO2014/060280
PCT Pub. Date: Apr. 24, 2014

(65) Prior Publication Data
US 2015/0280758 A1    Oct. 1, 2015

(30) Foreign Application Priority Data

Oct. 16, 2012  (FR) ..................... 12 59863

(51) Int. Cl.
*H04B 1/06* (2006.01)
*H04L 27/26* (2006.01)
(Continued)

(52) U.S. Cl.
CPC ............. *H04B 1/06* (2013.01); *H04L 5/0005* (2013.01); *H04L 27/2647* (2013.01); *H04L 47/225* (2013.01); *H04L 47/27* (2013.01)

(58) Field of Classification Search
CPC .................................. H04L 1/06; H04L 27/26
See application file for complete search history.

(56) References Cited

U.S. PATENT DOCUMENTS

2007/0155348 A1    7/2007    Razavi et al.
2011/0189970 A1    8/2011    Ohshiro
(Continued)

FOREIGN PATENT DOCUMENTS

| EP | 1 482 648 | 12/2004 |
| EP | 1 580 901 | 9/2005 |
| FR | 1 259 861 | 4/1961 |

OTHER PUBLICATIONS

Bautista, et al., "Low power beamforming RF architecture enabling fine ranging and AOA techniques", IEEE International Conference on Ultra-Wideband, (Sep. 14, 2011), pp. 585-589, XP 032115737.
(Continued)

*Primary Examiner* — Jaison Joseph
(74) *Attorney, Agent, or Firm* — Oblon, McClelland, Maier & Neustadt, L.L.P.

(57) ABSTRACT

A pulsed multi-channel UWB receiver. The receiver includes a first stage translating a received signal into baseband or at an intermediate frequency, a second stage carrying out quadrature mixing on the in-phase and quadrature channels of the first stage, a third stage carrying out an integration on a time window of the signals from the second stage, and a fourth stage carrying out a combination of the integration results from the third stage to provide the real part and the imaginary part of the modulation symbol. The receiver is configurable according to the receiving channel and processing type selected.

17 Claims, 13 Drawing Sheets

(51) Int. Cl.
*H04L 12/815* (2013.01)
*H04L 12/807* (2013.01)
*H04L 5/00* (2006.01)

(56) References Cited

U.S. PATENT DOCUMENTS

| | | | |
|---|---|---|---|
| 2013/0021291 A1* | 1/2013 | Kremin | G06F 3/0416 345/174 |
| 2014/0204977 A1* | 7/2014 | Morche | H04B 1/69 375/130 |
| 2014/0243016 A1 | 8/2014 | Denis et al. | |
| 2014/0256353 A1 | 9/2014 | Denis et al. | |
| 2014/0287776 A1 | 9/2014 | Denis et al. | |

OTHER PUBLICATIONS

Wu, et al., "A 5-GHz CMOS Double-Quadrature Receiver Front-End With Single-Stage Quadrature Generator", IEEE Journal of Solid-State Circuits, vol. 39, No. 3, (Mar. 1, 2004), pp. 519-521, XP 011108382.

Masson, et al., "A 1 nJ/b 3.2-to-4.7 GHz UWB 50 Mpulses/s Double Quadrature Receiver for Communication and Localization", IEEE, (2010), pp. 502-505.

Nauta, "A CMOS Transconductance-C Filter Technique for Very High Frequencies", IEEE Journal of Sloid-Satte Circuits, vol. 27, No. 2, (Feb. 1992), pp. 142-153.

International Search Report Issued Jan. 8, 2014 in PCT/EP13/071131 Filed Oct. 10, 2013.

French Search Report Issued Jun. 12, 2013 in Application No. 1259863 Filed Oct. 16, 2012.

U.S. Appl. No. 14/435,370, filed Apr. 13, 2015, Dehmas, et al.

U.S. Appl. No. 14/435,283, filed Apr. 13, 2015, Dehmas, et al.

U.S. Appl. No. 14/739,072, filed Jun. 15, 2015, Dehmas, et al.

* cited by examiner

RECONFIGURABLE MULTI-CHANNEL UWB RECEIVER

TECHNICAL FIELD

The present invention relates to the field of UWB (Ultra Wide Band) receivers and more particularly, those that can operate in several frequency channels.

STATE OF PRIOR ART

Ultra-Wide Band (UWB) telecommunication systems, whether they are of the pulsed type or not should emit in certain well determined frequency bands, depending on regional regulations, and with a frequency spectrum of minimum width (500 MHz in the USA).

The lack of harmonization in the regulations at the international level on the one hand and the multiplication of UWB standards for different application types, on the other hand, lead to provide receivers capable of operating in several frequency bands.

FIG. 1 gives by way of example the frequency plan used in IEEE 802.15.4a and IEEE 802.15.16 standards, in the 3-5 GHz band. The same frequency plan is anyway simply offset in the 7-9 GHz band. It is reminded that IEEE 802.15.4a and IEEE 802.15.16 standards both use a pulsed UWB transmission, IEEE 802.15.4a standard being relative to LDR (Low Data Rate) UWB transmission for location applications and IEEE 802.15.6 standard relating to Body Area Network (BAN) a component of which implements a UWB transmission.

It can be seen that the frequency plan comprises four channels. Channels 1, 2, 3 are each 500 MHz wide and are respectively centered on 3.5, 4 and 4.5 GHz, that is with a spacing of about 500 MHz. Channel 4 is centered on 4 GHz and is about 1 GHz wide. It is understood that it is advantageous to have a single UWB receiver capable of switching between these different bands and band widths.

A first UWB receiver type, referred to as homodyne or with a direct conversion, is known from document EP-A-1 482 648 and represented in FIG. 2. This receiver comprises a single quadrature mixing stage 210 with a frequency substantially equal to the center frequency of the received signal to bring the useful signal back into baseband. The baseband signal is then filtered using low-pass filters 220, to remove parasitic components at twice the mixing frequency, before being sampled and digitized by analog-digital converters 230. This UWB receiver is of course here a single channel one given that the mixing frequency is fixed.

A second UWB receiver type known from the state of the art has been described in application EP-A-1 580 901 and illustrated in FIG. 3A. As the previous one, this receiver comprises a first stage 310, carrying out a translation into baseband using a quadrature mixing at the center frequency of the signal. The in-phase and quadrature signals are respectively noted $s_I, s_Q$. It further includes a second stage comprising a first quadrature mixer 321, at the output of the in-phase channel of the first stage, and a second quadrature mixer 322, at the output of the quadrature channel of the first stage. The quadrature mixers 321 and 322 carry out a projection of the signals $s_I, s_Q$, on a base consisting of two orthogonal sine curves. The signals obtained by projection, noted $s_{II}, s_{IQ}$ for the channel I and $s_{QI}, s_{QQ}$ for the channel Q are integrated inside a time window, in the integrators 330. The sine curves making up the orthogonal projection base have a period equal to the width of this time window (also called time window). The integrated signals, noted $r_{II}, r_{IQ}, r_{QI}, r_{QQ}$, are quadratically summed in 335, 340. The sum thus obtained is then compared to a threshold value in 350 to determine whether the time window contains a UWB pulse, which enables the window to be synchronized with this pulse. This UWB receiver, hereinafter called orthogonal projection receiver, enables the detection of the pulsed signal to be improved.

A receiver architecture according to FIG. 3A has been detailed in the article of G. Masson et al. entitled "A 1 nJ/b 3.2 to 4.7 GHz UWB 50 Mpulses/s double quadrature receiver for communication and localization" published in Proc. of the ESSCIRC 2010, 14-16 Sep. 2010, Seville, Spain.

The orthogonal projection receiver has been the subject of an improvement described in the similar application FR-1259861, filed on behalf of the present applicants, and illustrated in FIG. 3B. Elements identical to those of FIG. 3A bear the same reference numerals.

Unlike the receiver of the FIG. 3A, the orthogonal projection base has herein a period equal to twice the width of the integration time window. For this reason, this receiver will be designated hereinafter as having a half-period sinusoidal projection. The integrated signals $r_{II}, r_{IQ}, r_{QI}, r_{QQ}$ are provided to a phase estimator 360 enabling the position of the UWB pulse to be determined within the time window. It will be then possible to correct any time window shift relative to the UWB pulse, from one recurrence to the other.

Finally, a UWB multi-channel receiver has been presented in application US-A-2007155348. This receiver, specifically adapted to MB-OFDM (Multi Band OFDM) transmission, that is a transmission using a channel OFDM modulation with a quick hopping from one channel to the other (frequency hopping). The high number of channels used for transmission and the very short switching time requires a complex architecture with a plurality of frequency synthetizers. The architecture proposed comprises a first stage of translation at a variable intermediate frequency, a second stage of mixing at a variable frequency using a bank of frequency synthetizers and finally a reconfigurable Weaver cell for removing image frequencies. However, this architecture is complex and unsuitable for receiving a pulsed UWB signal in a low consumption context.

The purpose of the present invention is to provide a pulsed UWB receiver architecture which could assume a great variety of configurations, in particular, which allows the channel to be received to be selected, a projection on an orthogonal base to be carried out or not, as explained in connection with FIG. 3A or, if any, on a half-period sinusoidal base, as explained in connection with FIG. 3B.

DISCLOSURE OF THE INVENTION

The present invention is defined by a pulsed UWB signal receiver in a receiving channel from a plurality of channels distributed about a center frequency, the receiver including:
  a first stage, comprising a first quadrature mixer operating at a first frequency, intended to translate said signal into baseband or at an intermediate frequency, the first stage providing an in-phase channel and a quadrature channel;
  a second stage, comprising a second quadrature mixer on said in-phase channel and a third quadrature mixer on said quadrature channel, the second mixer operating at a second frequency and providing a first in-phase signal and a second quadrature signal, the third mixer operating at said second frequency and providing a second in-phase signal and a second quadrature signal;
  a third stage integrating said first in-phase and quadrature signals, as well as said second in-phase and quadrature signals, on a time window, to provide first, second, third and fourth integration results respectively;

the receiver further including a fourth stage combining the first, second, third and fourth integration results by means of combination coefficients to provide at least a real part and an imaginary part of a modulation symbol; and in that:

the first frequency is equal to the center frequency;

the second frequency and combination coefficients are controllable as a function of the receiving channel.

Advantageously, the first stage comprises a first filter on the in-phase channel and a second filter on the quadrature channel, of identical characteristics, controllable as a function of the receiving channel.

If the receiving channel is centered on the center frequency, the characteristics of the first and second filters are controlled such that they are configured as low-pass filters.

Alternatively, if the receiving channel is offset with respect to the center frequency, the characteristics of the first and second filters are controlled such that they are configured as pass-band filters.

Advantageously, the second frequency is selected equal to the frequency offset.

According to an operating configuration, the combination coefficients are selected so as to carry out a rejection of the image frequency of the receiving channel with respect to the center frequency.

According to another operating configuration, the second stage operates in a transparent mode.

The transparent mode can be obtained by shunting the second and third mixers by means of shunt switches connected to the same.

Alternatively, the transparent mode is obtained by selecting the second frequency equal to zero.

According to another operating configuration, the receiving channel is centered on the center frequency and the second stage is configured in a transparent mode.

In this case, according to a first alternative, the fourth stage carries out a selection between the first and second integration results to provide the real part of the modulation symbol, and a selection between the third and fourth integration results to provide the imaginary part of the modulation symbol.

According to a second alternative, the fourth stage works out an average between the first and second integration results to provide the real part of the modulation symbol, and an average between the third and fourth integration results to provide the imaginary part of the modulation symbol.

According to yet another operating configuration, the receiving channel is centered on the center frequency and the width of the time window is equal to a period of the second frequency.

According to yet another operating configuration, the receiving channel is centered on the center frequency and the width of the time window is equal to a half-period of the second frequency.

According to a first alternative, the fourth stage works out a sum of the first and fourth integration results to provide the real part of the modulation symbol, and it works out the difference of the second and third integration results to provide the imaginary part of the modulation symbol.

According to a second alternative, the fourth stage is configurable in a transparent mode.

In all the abovementioned configurations, the first frequency, the second frequency and the recurrence frequency of the time window are advantageously provided by a frequency synthetizer.

BRIEF DESCRIPTION OF THE DRAWINGS

Further characteristics and advantages of the invention will appear upon reading a preferential embodiment of the invention made in reference to the appended figures in which.

DETAILED DISCLOSURE OF PARTICULAR EMBODIMENTS

In the following, there will be considered a receiver intended to receive a pulsed signal that can be emitted in different possible bands of a frequency plan. It is reminded that a pulsed UWB signal consists of ultra-short pulses (in the order of one nanosecond or one hundred picoseconds) being repeated with a recurrence period, wherein an information symbol is transmitted by means of phase, amplitude and/or position modulation of a plurality of successive pulses.

Figure 4:
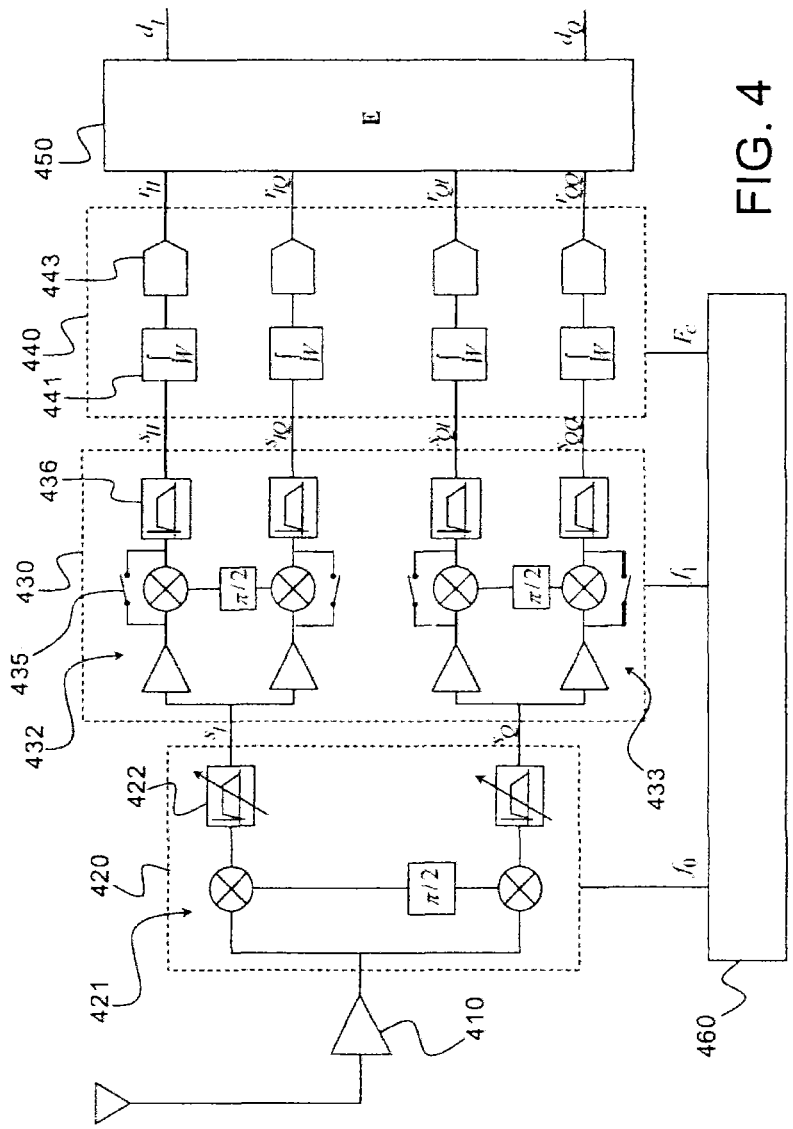
FIG. 4 represents the architecture of a UWB receiver according to one embodiment of the invention.

FIG. 4 schematically represents a UWB receiver according to one embodiment of the invention and more precisely its analog input stage before digital demodulation.

The UWB receiver comprises at its input a low noise amplifier (LNA), 410. Advantageously, the pass-band of the LNA covers all the channels of the frequency plan. Alternatively, the LNA is more selective and its pass-band is centered on the desired channel. Finally, a low noise amplifier can be provided the pass-band of which can be controlled to select the channel of interest.

The low noise amplifier is followed by a first frequency translation stage 420. It will be seen in the following that this stage allows, according to the configuration, the received signal to be brought back into baseband or to be offset at a determined intermediate frequency. This first stage conventionally comprises a first quadrature mixer 421. The frequency $f_0$, used for mixing is the center frequency of the frequency plan, in other words the symmetry frequency of the distribution of the different channels. It is provided by frequency synthetizer 460, made for example, in a manner known per se, from a frequency controlled oscillator regulated by a phase-locked loop.

The in-phase and quadrature signals at the output of the quadrature mixer $s_I, s_Q$ are respectively filtered by means of the filters 423 and 424. These filters have controllable high and low cut-off frequencies. According to the configuration contemplated, they can carry out a low-pass filtering or a band-pass filtering. They can advantageously be made as bi-quad type gm-C filters. In such a filter, the pass-band can be changed by varying its control voltage. An example of gm-C filter is described in the article of B. Nauta entitled "A CMOS transconductance-C filter technique for very high frequencies", IEEE Journal of Solid States Circuits, vol. 27, No 2, February 1992.

Thus filtered signals $s_I, s_Q$ pass through a second stage, 430, comprising a second quadrature mixer 432, on the in-phase channel, and a third quadrature mixer 433, on the quadrature channel. The frequency, $f_1$, used by the second and third mixers is provided by the frequency synthetizer 460.

The in-phase signal, $s_I$, can be amplified before being mixed by the second mixer, 432. The in-phase and quadrature outputs of this mixer are noted $s_{II}, s_{IQ}$ respectively. They are advantageously filtered by low-pass filters, 436, the cut-off frequency of which can be controllable. In a similar way, the quadrature signal, $s_Q$, can be amplified before being mixed by the third mixer 433. The in-phase and quadrature outputs of this mixer are noted $s_{QI}, s_{QQ}$ respectively. The second stage, 430, can be shunted according to the configuration assumed by the receiver by the switches 435. Alternatively, the second stage 430 is shunted by simply selecting the frequency $f_1$ equal to 0.

The signals at the output of the second stage, which can possibly be shunted as explained above, are integrated (and digitized) by a stage 40. More precisely, these signals are integrated in a time window by the integrators 441. The recurrence frequency, $F_c$, of the integration window is provided by the frequency synthetizer 460. The integration results on the different channels, $r_{II}, r_{IQ}, r_{QI}, r_{QQ}$, are digitized thanks to the analog/digital converters 443.

The integration results are then combined in a combination stage 450. This stage works out a combination operation which can be represented in a matrix way by:

$$\begin{pmatrix} d_I \\ d_Q \end{pmatrix} = \begin{pmatrix} \varepsilon_{II}^I & \varepsilon_{IQ}^I & \varepsilon_{QI}^I & \varepsilon_{QQ}^I \\ \varepsilon_{II}^Q & \varepsilon_{IQ}^Q & \varepsilon_{QI}^Q & \varepsilon_{QQ}^Q \end{pmatrix} \begin{pmatrix} r_{II} \\ r_{IQ} \\ r_{QI} \\ r_{QQ} \end{pmatrix} \quad (1)$$

where $d_I$ and $d_Q$ are respectively the real part and the imaginary part of a (complex) modulation symbol d, and the elements of the matrix belong to the set $\{-1, 0, +1\}$. The matrix $$E = \begin{pmatrix} \varepsilon_{II}^I & \varepsilon_{IQ}^I & \varepsilon_{QI}^I & \varepsilon_{QQ}^I \\ \varepsilon_{II}^Q & \varepsilon_{IQ}^Q & \varepsilon_{QI}^Q & \varepsilon_{QQ}^Q \end{pmatrix}$$

depends on the receiver configuration.

The modulation symbol can then be digitally demodulated in a manner known per se.

Figure 1:
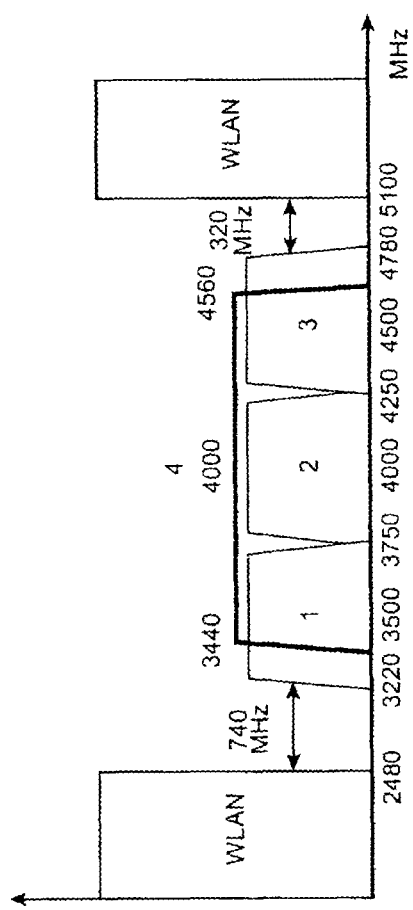
FIG. 1, already described, represents an exemplary frequency plan in a UWB spectral band.
Figure 2:
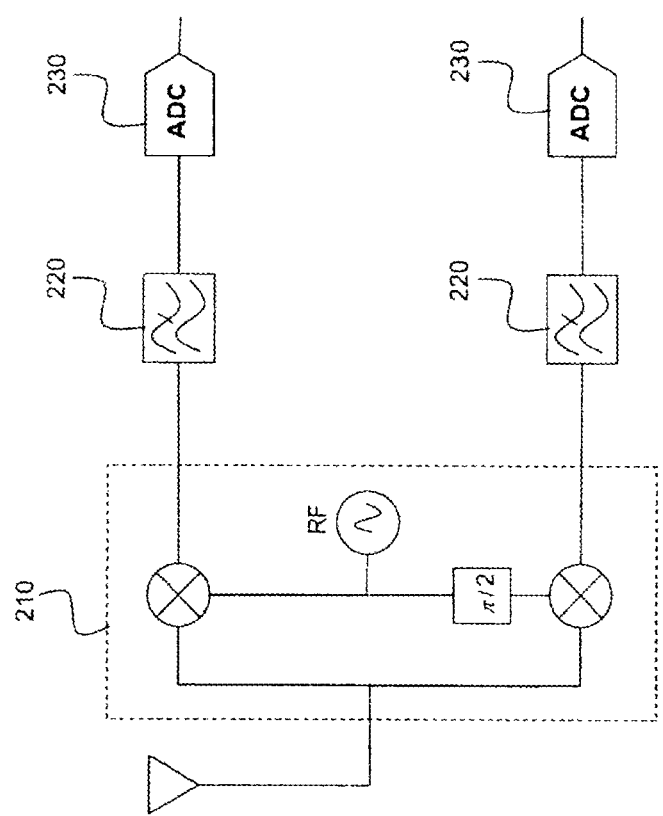
FIG. 2, already described, schematically represents a first exemplary UWB receiver known to from the state of the art.
Figure 3A:
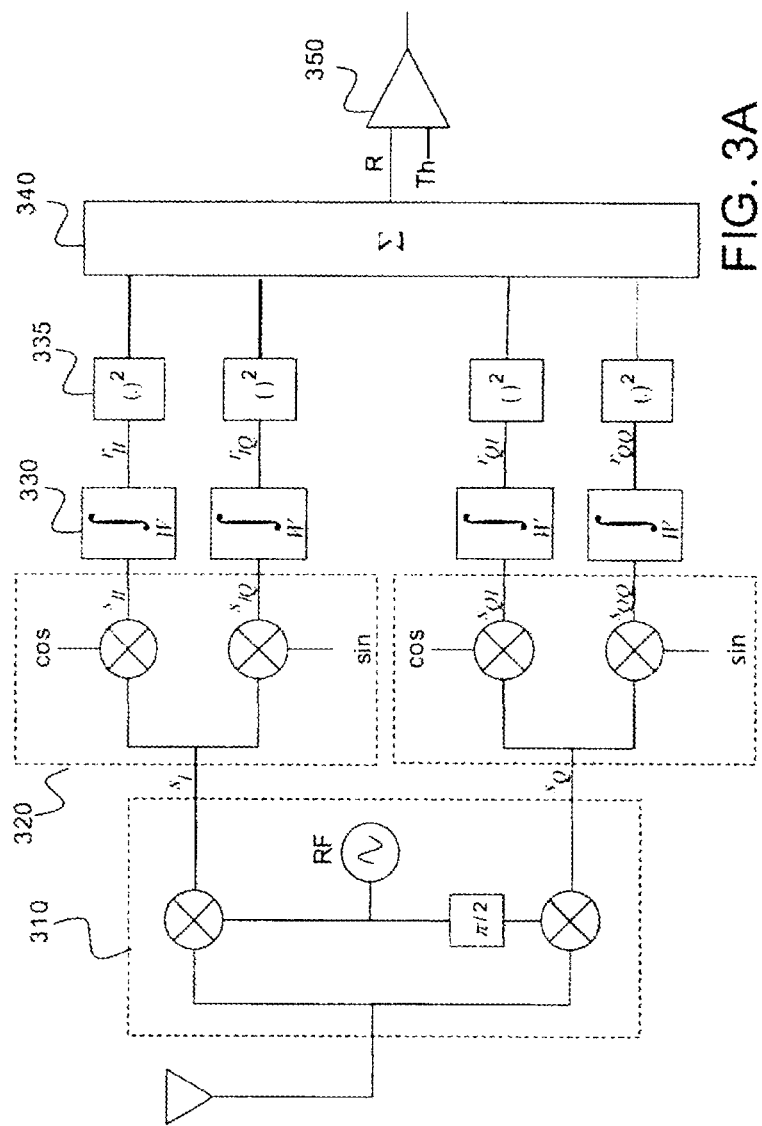
FIG. 3A, already described, schematically represents a second exemplary pulsed type UWB receiver, known from the state of the art.
Figure 3B:
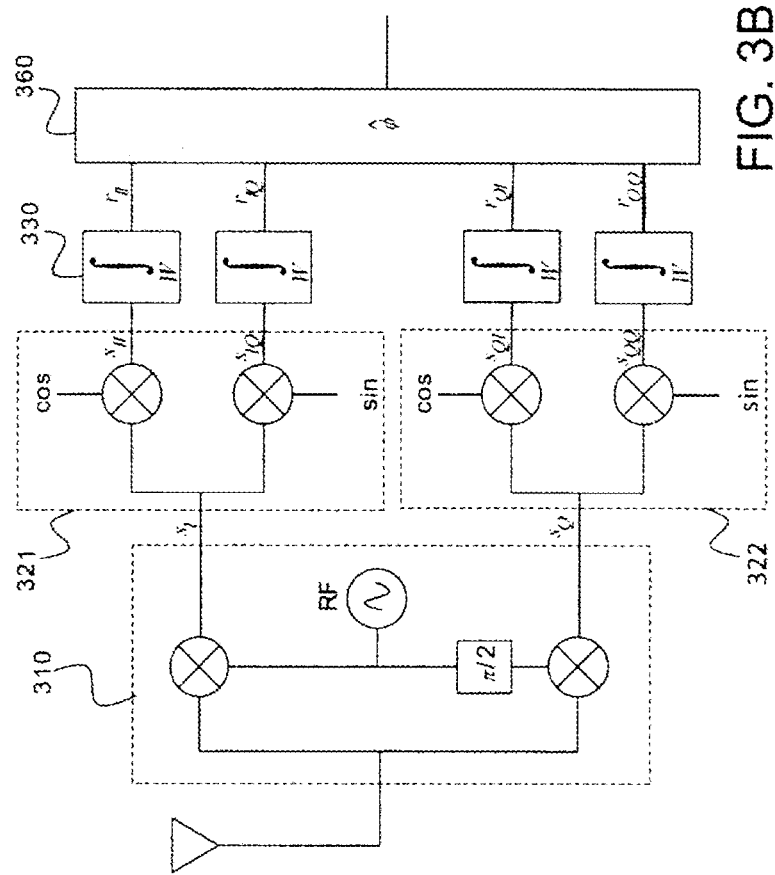
FIG. 3B, already described schematically represents an improvement of the UWB receiver of FIG. 3A.

By way of example and without prejudice to generality, it will be assumed in the following that the receiver is intended to receive a pulsed UWB signal in the channels 1 to 4 of the frequency plan of FIG. 1.

Figure 4A:
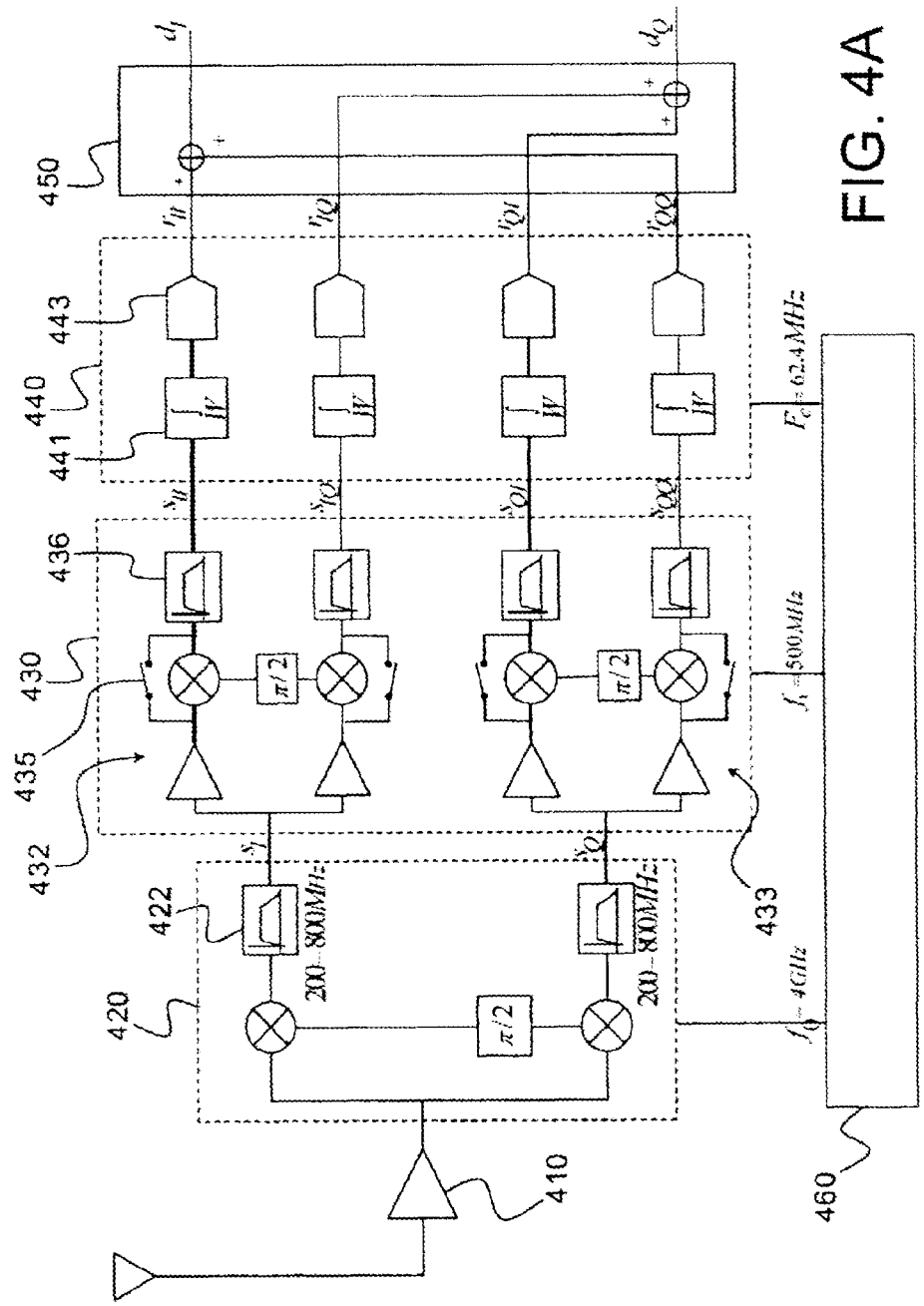
FIG. 4A represents the UWB receiver of FIG. 4 in a first operating configuration.

FIG. 4A represents a first configuration of the UWB receiver.

In this configuration, the receiver receives the channel 1 (centered on 3.5 GHz). To do this, the first quadrature mixer 421 of the first stage 420 operates at the frequency $f_0 = 4$ GHz and the second and third mixers, 431, 432 of the second stage 430, operate at the frequency $f_1 = 500$ MHz.

Thus, the first stage 420 translates the band of interest at the 500 MHz intermediate frequency. The filters 421 and 422 are configured as pass-band filters centered about this frequency. For example, the pass-band of these filters could be selected as being 200-800 MHz. The second stage 430 brings back the signal of interest into baseband. The combination of the first and second stages thus enables the receiver to operate in a heterodyne mode.

Signals $s_{II}, s_{IQ}$ and $s_{QI}, s_{QQ}$ are integrated in the time window (being here repeated with a 62.4 MHz frequency) within the integration stage 440.

The combination stage 450 is configured as a Weaver cell. Such a cell allows the rejection of the image frequency of the signal (symmetrical frequency of the center frequency of the signal, that is 3.5 GHz, relative to the frequency of the first mixing, that is 4 GHz). The coefficients of the combination matrix depend on the local oscillator phase at the frequency $f_0$ and that of the local oscillator at the frequency $f_1$. For example, if the in-phase channels receive a cos signal and the quadrature channels a sin signal, the combination matrix will be in the following form:

$$E = \begin{pmatrix} 1 & 0 & 0 & 1 \\ 0 & 1 & -1 & 0 \end{pmatrix} \quad (2)$$

On the other hand, for example, if the in-phase channel of the first stage receives a sin signal whereas its quadrature channel receives a cos signal, we have, with the same phases as previously for the second stage:

$$E = \begin{pmatrix} 0 & 1 & 1 & 0 \\ -1 & 0 & 0 & 1 \end{pmatrix} \quad (2')$$

Those skilled in the art will understand that the combination matrix could take other forms according to the local oscillator phases at the frequencies $f_0$ and $f_1$. These forms are deducted from (2) by column permutations.

Figure 4B:
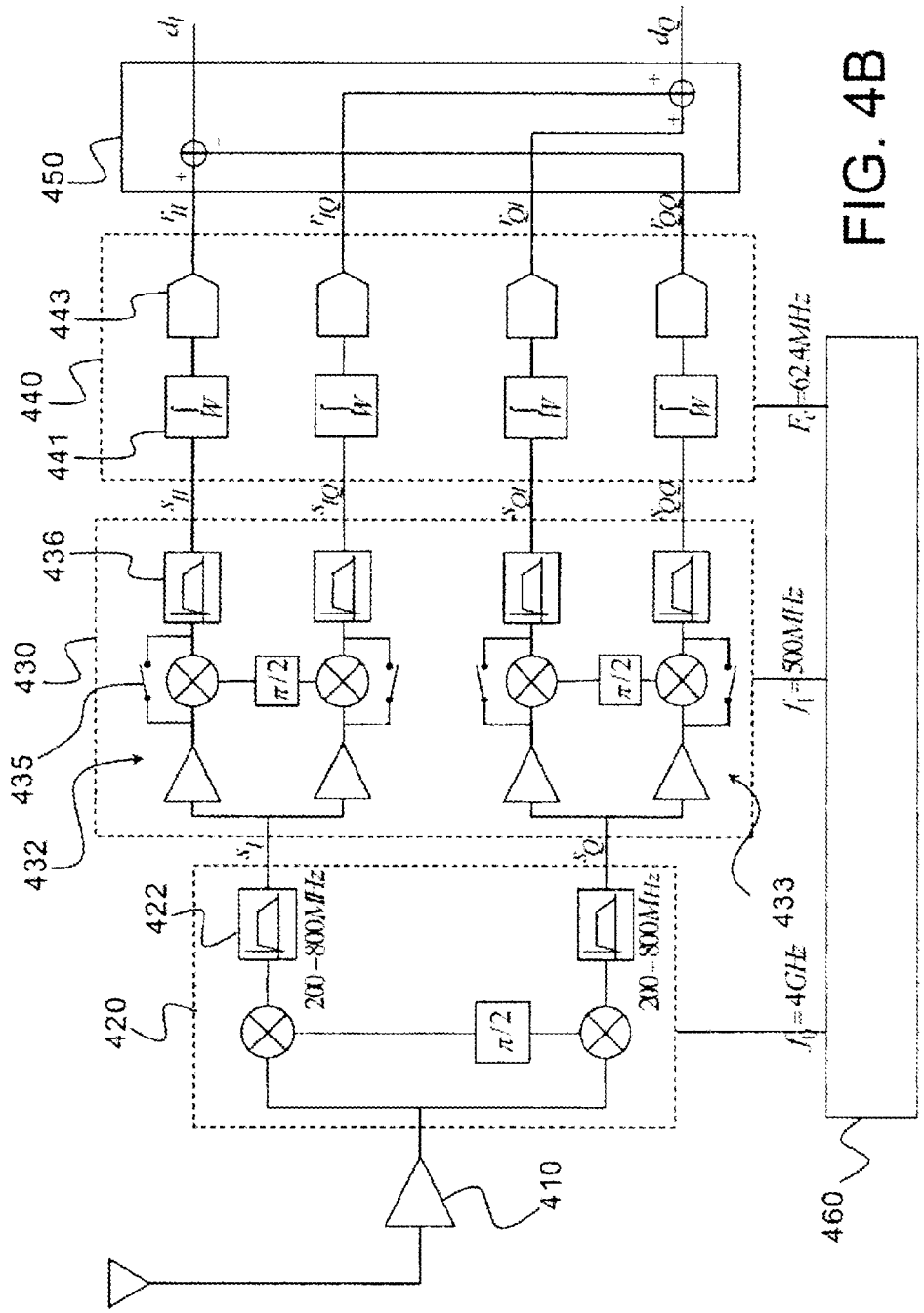
FIG. 4B represents the UWB receiver of FIG. 4 in a second operating configuration.

FIG. 4B represents a second configuration of the UWB receiver.

In this configuration, the receiver receives the channel 3 (centered on 4.5 GHz). To do this, the first quadrature mixer 421 of the first stage 420 operates at the frequency $f_0 = 4$ GHz and the second and third mixers, 431, 432 of the second stage 430, operate at the frequency $f_1 = 500$ MHz.

Thus, the first stage 420 translates the band of interest at the 500 MHz intermediate frequency. The filters 421 and 422 are configured as band-pass filters centered about this frequency. For example, the pass-band of these filters can be selected as being 200-800 MHz. The second stage 430 brings back the signal of interest into baseband. As in the previous configuration, the combination of the first and second stages enables the receiver to operate in a heterodyne mode.

Signals $s_{II}, s_{IQ}$ and $s_{QI}, s_{QQ}$ are integrated in the time window (being repeated here with a 62.4 MHz frequency) within the integration stage 440.

The combination stage 450 is again configured as a Weaver cell. The coefficients of the combination matrix depend on the local oscillator phase at the frequency $f_0$ and that of the local oscillation at the frequency $f_1$. If the in-phase channels receive a cos signal and the quadrature channels a sin signal, the combination matrix will be in the following form:

$$E = \begin{pmatrix} 1 & 0 & 0 & -1 \\ 0 & 1 & 1 & 0 \end{pmatrix} \quad (3)$$

On the other hand, for example, if the in-phase channel of the first stage receives a sin signal whereas its quadrature channel receives a cos signal, we have, with the same phases as previously for the second stage:

$$E = \begin{pmatrix} 0 & -1 & 1 & 0 \\ 1 & 0 & 0 & 1 \end{pmatrix} \quad (3')$$

The combination matrix could take other forms according to the local oscillator phases at the frequencies $f_0$ and $f_1$. These forms are deduced from (3) by column permutations.

Figure 4C:
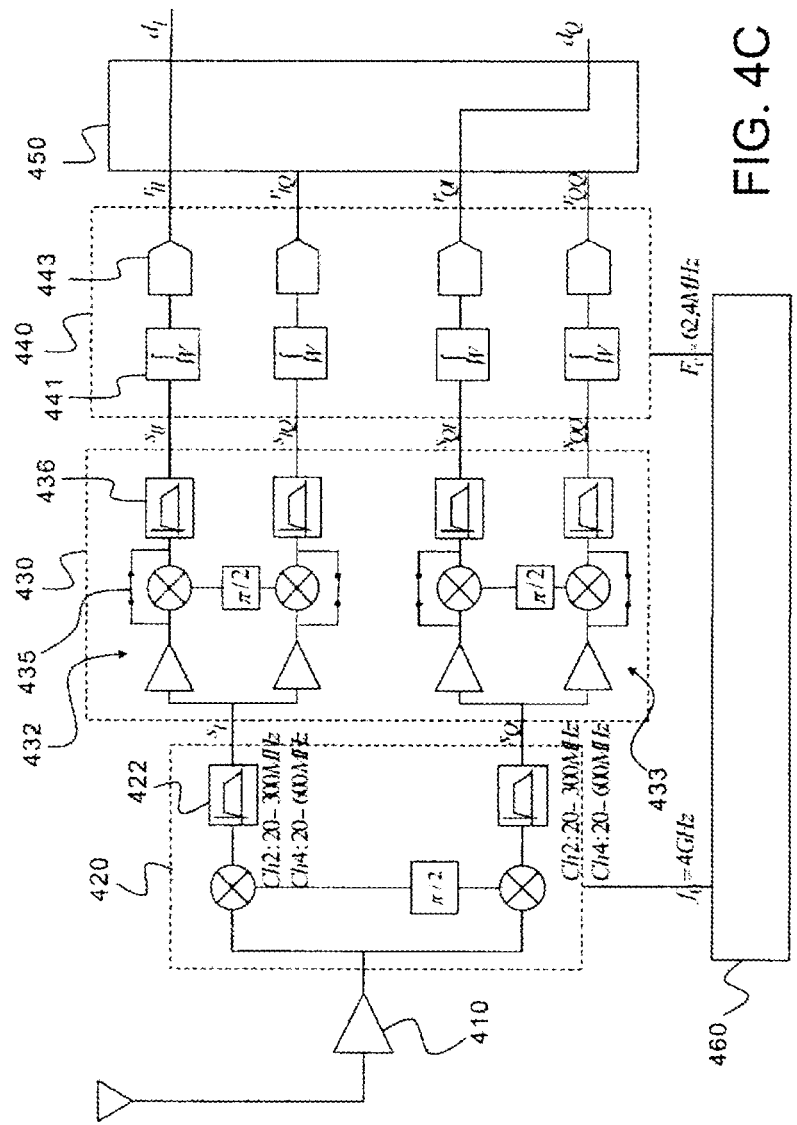
FIG. 4C represents the UWB receiver of FIG. 4 in a third operating configuration.

FIG. 4C represents a third configuration of the UWB receiver.

In this configuration, the receiver receives the channel 2 or 4 (centered on 4 GHz) without carrying out an orthogonal projection. To do this, the first quadrature mixer 421 of the first stage 420 operates at the frequency $f_0$=4 GHz and the second stage 430 is shunted. The receiver thus operates in a homodyne mode.

The first stage 420 brings back the signal of interest into baseband. The filters 421 and 422 are configured as low-pass filters with, for example, a 300 MHz cut-off frequency for the channel 2 and a 600 MHz cut-off frequency for channel 4.

Signals $s_{II}$ and $s_{QI}$ are integrated in the time window (being here repeated with a 62.4 MHz frequency) within the integration stage 440. Signals $s_{IQ}$ and $s_{QQ}$ need not be integrated and the corresponding channels can on the other hand can be deactivated to save energy of the power source.

The combination stage 450 is configured to select the active channels, in other words:

$$E = \begin{pmatrix} 1 & 0 & 0 & 0 \\ 0 & 0 & 1 & 0 \end{pmatrix} \quad (4)$$

Of course, if the signals $s_{IQ}$ and $s_{QQ}$ had been integrated and the channels corresponding to the signals $s_{II}$ and $s_{QI}$ had been deactivated, the combination matrix would be in the form:

$$E = \begin{pmatrix} 0 & 1 & 0 & 0 \\ 0 & 0 & 0 & 1 \end{pmatrix} \quad (4')$$

Figure 4D:
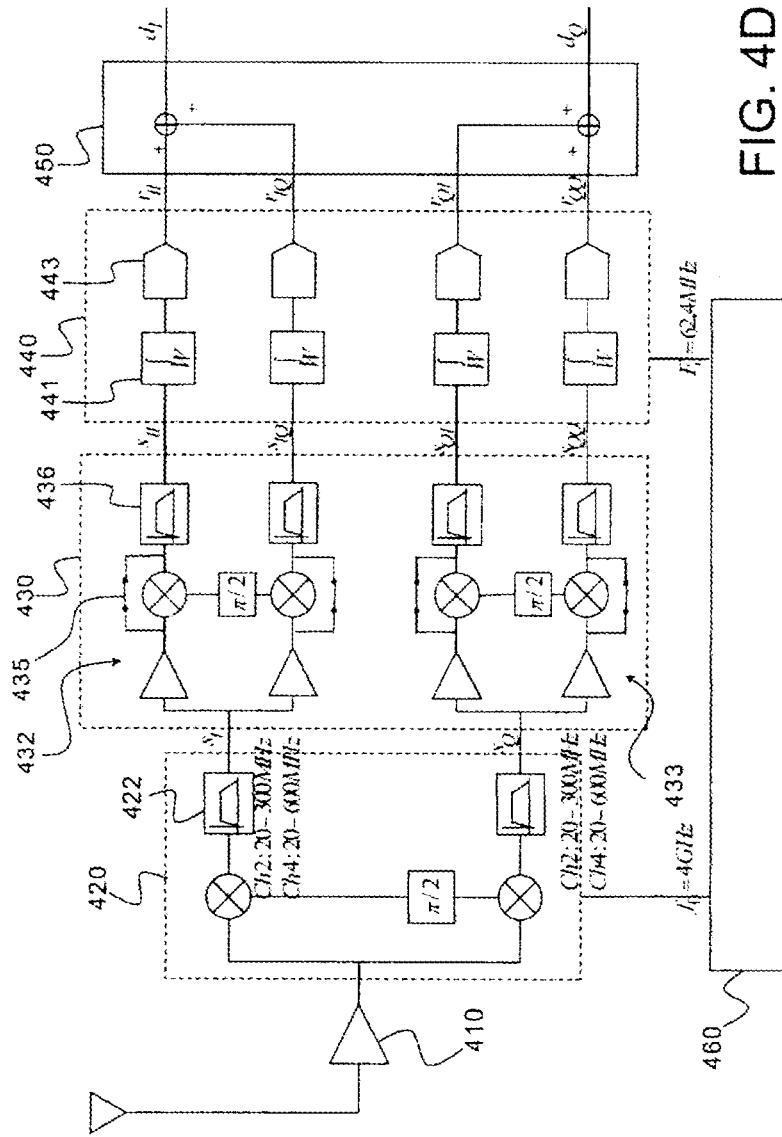
FIG. 4D represents the UWB receiver of FIG. 4 in a fourth operating configuration.

FIG. 4D represents a fourth configuration of the UWB receiver.

This configuration allows channels 2 and 4 to be received, without an orthogonal projection. It differs from FIG. 4C in that all the channels are herein active. Signals $s_{II}$ and $s_{IQ}$ are however identical since the second stage is shunted (closing switches 435 or mixing at DC frequency). Likewise, signals $s_{QI}$ and $s_{QQ}$ are identical. Signals $s_{II}$, $s_{IQ}$ and $s_{QI}$, $s_{QQ}$ are integrated in the time window and the integration results are combined by stage 450 by means of the combination matrix:

$$E = \begin{pmatrix} 1 & 1 & 0 & 0 \\ 0 & 0 & 1 & 1 \end{pmatrix} \quad (5)$$

This stage works out an average of values $r_{II}, r_{IQ}$, on the one hand, and values $r_{QI}, r_{QQ}$, on the other hand, which enables a better signal to noise ratio to be achieved.

Figure 4E:
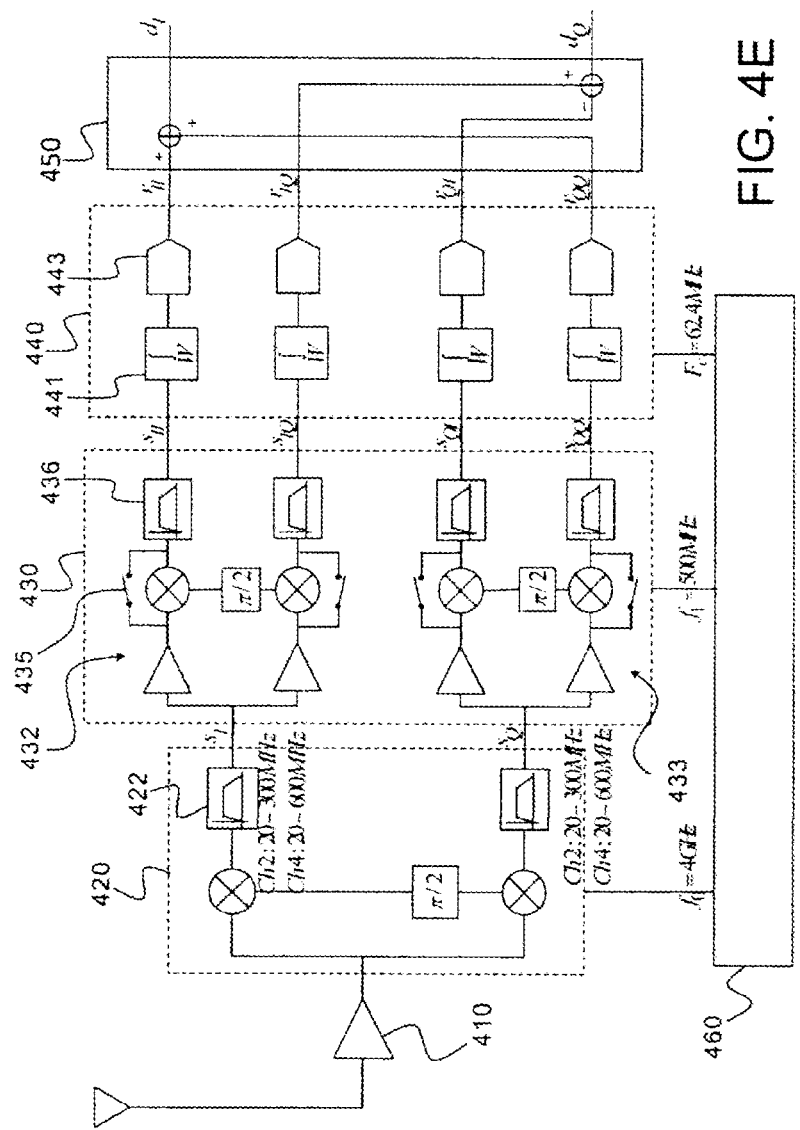
FIG. 4E represents the UWB receiver of FIG. 4 in a fifth operating configuration.

FIG. 4E represents a fifth configuration of the UWB receiver.

This configuration allows channels 2 and 4 to be received, an orthogonal base projection to be carried out.

Figure 4F:
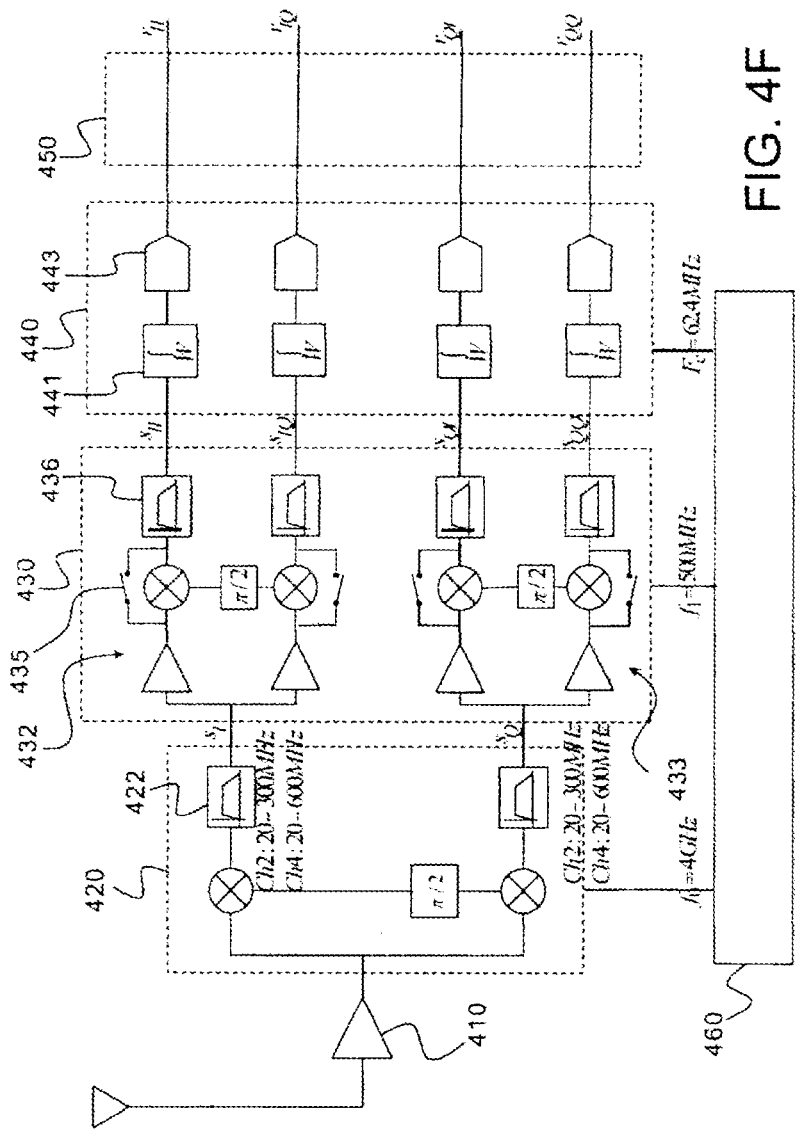
FIG. 4F represents the UWB receiver of FIG. 4 in a sixth operating configuration.

Then, it can be determined whether the time window contains a UWB pulse by switching the receiver on a sixth configuration illustrated in FIG. 4F.

In these fifth and sixth configurations, as in the third and fourth ones, the first stage 420 carries out the translation of the received signal into baseband (direct conversion). The frequency $f_0$ of the first stage is selected equal to 4 GHz.

Filters 421 and 422 are configured as low-pass filters (300 MHz cut-off frequency for channel 2 and 600 MHz cut-off frequency for channel 4).

The second stage 430 carries out the projection of each of the signals $s_I$ and $s_Q$ on an orthogonal base consisting of quadrature sine curves at the frequency $f_1$=500 MHz.

The third stage 440 carries out the integration of the signals $s_{II}$, $s_{IQ}$ and $s_{QI}, s_{QQ}$ in the time window. The latter has a width equal to a period of the mixing frequency, $f_1$, of sine curves making up the projection base, that is here 2 ns. The recurrence period of the time window is selected for example equal to 62.4 MHz.

In the fifth configuration, the integration results in the window, $r_{II}, r_{IQ}, r_{QI}, r_{QQ}$ are combined in the combination stage 450 by means of the combination matrix:

$$E = \begin{pmatrix} 1 & 0 & 0 & 1 \\ 0 & 1 & -1 & 0 \end{pmatrix} \quad (6)$$

When it is desired to determine whether the time window does contain a pulse, it is sufficient to switch the combination stage into a transparent mode as illustrated in FIG. 4F. The integration results can then be quadratically summed:

$$R = r_{II}^2 + r_{IQ}^2 + r_{QI}^2 + r_{QQ}^2 \quad (7)$$

and the quadratic sum is compared with a threshold to determine whether a pulse is actually present in the window.

Figure 4G:
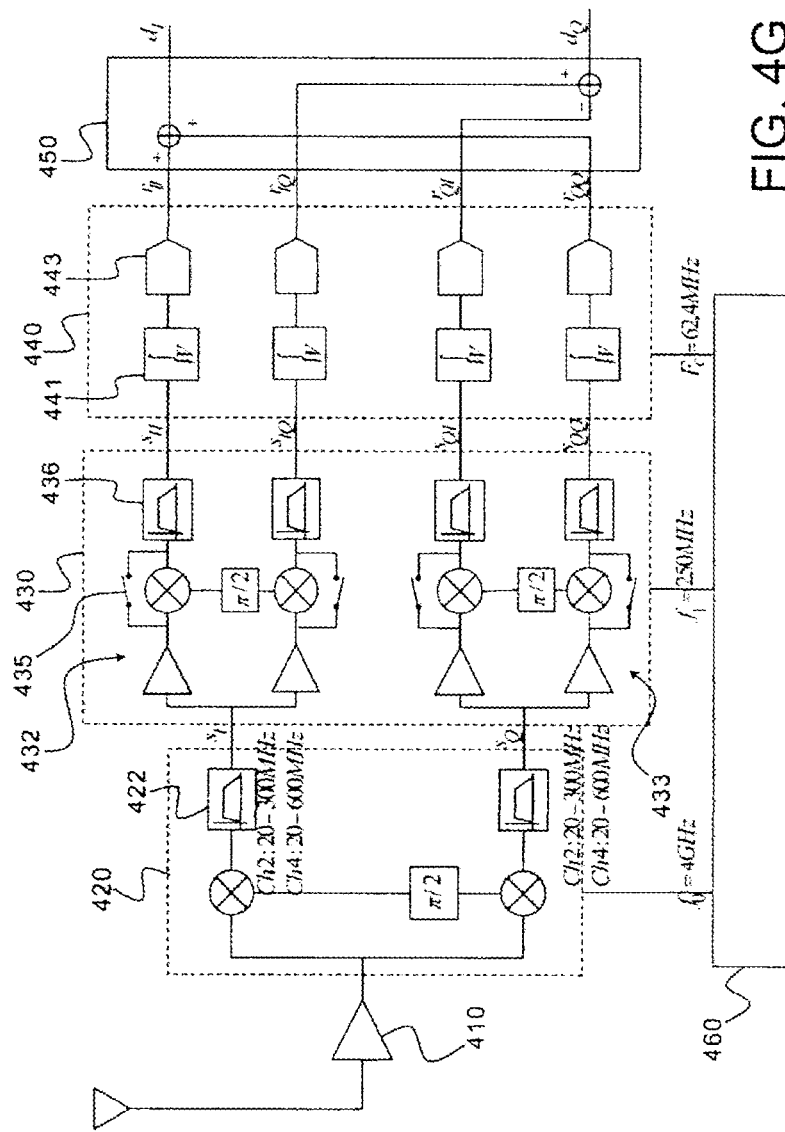
FIG. 4G represents the UWB receiver of FIG. 4 in a seventh operating configuration.

FIG. 4G represents a seventh configuration of the UWB receiver.

This configuration allows channels 2 and 4 to be received, and a half-period sinusoidal orthogonal base projection to be carried out.

Figure 4H:
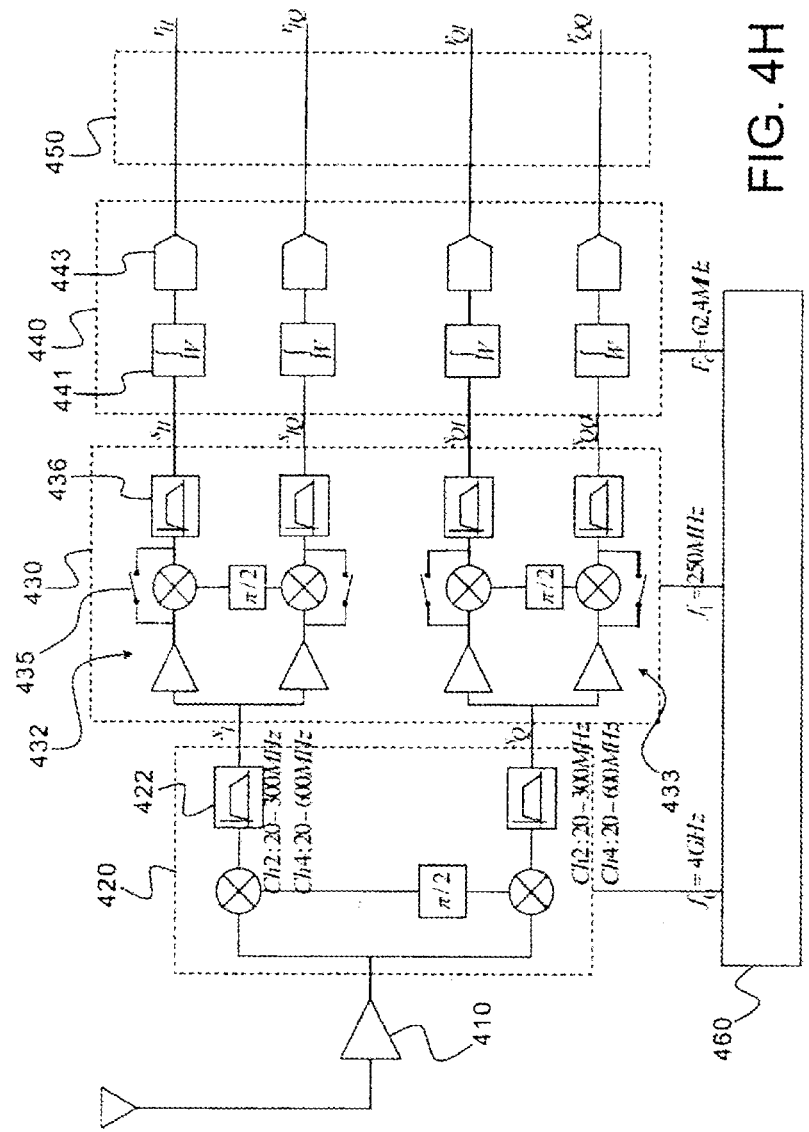
FIG. 4H represents the UWB receiver of FIG. 4 in an eighth operating configuration.

The pulse position can then be accurately determined within the time window by switching the receiver to an eighth configuration represented in FIG. 4H.

The seventh and eighth configurations are respectively identical to the fifth and sixth ones, with the difference that the frequency of the sine curves used as an orthogonal projection base of the second stage is 250 MHz. More generally, in both latter configurations, the width of the time window is equal to a half-period of the mixing frequency of the second stage.

Thus, when it is desired to determine the time position of the pulse in the time window, it is sufficient to switch the combination stage into a transparent mode as illustrated in FIG. 4H and then calculate the phase:

$$\hat{\varphi}_I = \arctan\left(\frac{r_{IQ}}{r_{II}}\right) \quad (8)$$

or $$\hat{\varphi}_Q = \arctan\left(\frac{r_{QQ}}{r_{QI}}\right) \quad (9)$$

the phases $\hat{\varphi}_I$ and $\hat{\varphi}_Q$ enabling the time position of the pulse in the window to be unambiguously obtained.

The invention claimed is:

1. A pulsed UWB signal receiver in a receiving channel from a plurality of channels distributed about a center frequency, the receiver comprising:
    a first stage, comprising a first quadrature mixer operating at a first frequency, configured to translate the signal into baseband or at an intermediate frequency, the first stage providing an in-phase channel and a quadrature channel;
    a second stage, comprising a second quadrature mixer on the in-phase channel and a third quadrature mixer on the quadrature channel, the second mixer operating at a second frequency and providing a first in-phase signal and a second quadrature signal, the third mixer operating at the second frequency and providing a second in-phase signal and a second quadrature signal;
    a third stage integrating the first in-phase and quadrature signals, and the second in-phase and quadrature signals, on a time window, to provide first, second, third, and fourth integration results respectively;
    a fourth stage combining the first, second, third, and fourth integration results by combination coefficients to provide at least a real part and an imaginary part of a modulation symbol; and
    wherein the first frequency is equal to the center frequency;
    wherein the second frequency and combination coefficients are controllable as a function of the receiving channel.

2. The receiver according to claim 1, wherein the first stage comprises a first filter on the in-phase channel and a second filter on the quadrature channel, of identical characteristics, controllable as a function of the receiving channel.

3. The receiver according to claim 2, wherein the receiving channel is centered on the center frequency, and the characteristics of the first and second filters are controlled to be configured as low-pass filters.

4. The receiver according to claim 2, wherein the receiving channel is offset with respect to the center frequency, and the characteristics of the first and second filters are controlled to be configured as pass-band filters.

5. The receiver according to claim 4, wherein the second frequency is selected equal to the frequency offset.

6. The receiver according to claim 5, wherein the combination coefficients are selected to carry out a rejection of the image frequency of the receiving channel with respect to the center frequency.

7. The receiver according to claim 1, wherein the second stage is configurable to operate in a transparent mode.

8. The receiver according to claim 7, wherein the transparent mode is obtained by shunting the second and third mixers by shunt switches connected to the second and third mixers.

9. The receiver according to claim 7, wherein the transparent mode is obtained by selecting the second frequency equal to zero.

10. The receiver according to claim 8, wherein the receiving channel is centered on the center frequency and the second stage is configured in the transparent mode.

11. The receiver according to claim 10, wherein the fourth stage carries out a selection between the first and second integration results to provide the real part of the modulation symbol, and a selection between the third and fourth integration results to provide the imaginary part of the modulation symbol.

12. The receiver according to claim 11, wherein the fourth stage works out an average between the first and second integration results to provide the real part of the modulation symbol, and an average between the third and fourth integration results to provide the imaginary part of the modulation symbol.

13. The receiver according to claim 1, wherein the receiving channel is centered on the center frequency and the width of the time window is equal to a period of the second frequency.

14. The receiver according to claim 2, wherein the receiving channel is centered on the center frequency and the width of the time window is equal to a half-period of the second frequency.

15. The receiver according to claim 13, wherein the fourth stage works out a sum of the first and fourth integration results to provide the real part of the modulation symbol, and works out the difference of the second and third integration results to provide the imaginary part of the modulation symbol.

16. The receiver according to claim 14, wherein the fourth stage is configurable in a transparent mode.

17. The receiver according to claim 1, wherein the first frequency, the second frequency, and the recurrence frequency of the time window are provided by a frequency synthesizer.

* * * * *